Patented Oct. 5, 1954

2,690,978

UNITED STATES PATENT OFFICE 2,690,978

BITUMINOUS EMULSION

Sherwood T. Cross, Elsmere, Del., assignor to Atlas Powder Company, Wilmington, Del., a corporation of Delaware No Drawing. Application October 4, 1950, Serial No. 188,483

12 Claims. (Cl. 106—277)

This invention relates to a composition of matter. More particularly it relates to a modified water and bitumen emulsion.

Water and bitumen emulsions are widely used as coating and adhesive compositions. Thus, they are employed in the waterproofing of concrete, cinder block and similar surfaces and in the control of dust on dirt surface roads. Both oil in water and water in oil types are used. One of the primary applications arises in road building where the mineral aggregate is given a bituminous coating prior to hard surfacing. One of the major difficulties experienced in such operations has been the failure of the coating to completely cover the mineral aggregate when the mineral aggregate is wet. Another difficulty has been the tendency of the applied bituminous coating to wash off the mineral aggregate when it is exposed to rain.

It is an object of the present invention to provide a water and bitumen emulsion composition which effectively coats both damp and dry surfaces of mineral aggregate used in road building as well as concrete, cinder block and the like. It is a further object of the present invention to provide a bituminous coating surface for mineral aggregate used in road building as well as concrete, cinder block and the like which resists stripping by water.

These and other objects will become apparent in the course of the following description of the invention.

In accordance with the present invention it has been found that water and bitumen emulsions when modified with a minor amount of certain polyethenoxy aliphatic amines to be described hereinafter may be used to coat surfaces of mineral aggregates used in road building as well as concrete, cinder block and the like, whether such surface be wet or dry. Furthermore, the coated surface thus provided resists stripping by water.

The polyethenoxy aliphatic amines useful in the present invention are formed by the reaction of ethylene oxide with the aliphatic amines conforming to the formula presented below, by processes known to the art. The particularly valuable members are those which are formed by the reaction of 3 to 5 mols of ethylene oxide per mol of the said amines. The amines which may serve as starting materials for preparation of the preferred group of additives may be represented by the formula

wherein $R_1$ is an aliphatic radical of from 12 to 20 carbon atoms and $R_2$ is a member of the class of $R_1$ and hydrogen. Thus, within the concept are included mono- and di-lauryl, myristyl, palmityl, stearyl, arachidyl, oleyl, linoleyl, linolenyl and the like and mixtures thereof. Particularly convenient and practical are the mixtures of amines derived from mixtures of fatty acids as obtained from natural sources such as tallow, and the oils of coconut, soybean, linseed, corn, peanut, olive, sunflower seed and the like.

The water and bitumen emulsions as employed in this invention are widely used and commercially available. As generally employed the bituminous phase has a specific gravity of 1.14 at 25° C., with a bitumen content of 82%, a float test at 50° C., within the range of 50 to 125 seconds and a distillation distribution as follows:

Up to 170° C., 0.0%
Up to 235° C., not more than 12.0%
Up to 270° C., not more than 20.0%
Up to 300° C., not more than 25.0%

The softening point of the residue from the distillation is generally within the range of 50° C., to 75° C.

The before mentioned polyethenoxy aliphatic amines may be added either to the finished emulsion or to the bituminous phase before or during the preparation of the emulsion. It has been found that the presence of even a trace of the said polyethenoxy aliphatic amines enhances the coating and adhesive qualities of the asphalt coating. However, the presence of about 0.1% is considered a minimum to obtain practical advantages although even this lower limit will vary among the various derivatives. Higher concentrations may be used without deleterious effects.

The test procedure employed to evaluate the various additives was as follows: 50 grams of a typical mineral aggregate was covered with water for 5 minutes. At the end of this period the water was poured off and the damp mineral aggregate was covered with 3 grams of the bitumen-water-fatty amine composition, mixing so as to completely coat the mineral aggregate. The excess emulsion was allowed to drain. The coated mineral aggregate was then submerged in water and the retention of coating on its surface was noted. The observations were classified according to the designations as indicated in Table I.

*Table I*

*V. poor.*—Emulsion failed to coat the mineral aggregate.
*Poor.*—More than half of coating stripped from the mineral aggregate on immersion.
*Fair.*—Less than half of coating stripped from the mineral aggregate on immersion.
*Good.*—Slight oil on surface of water. Mineral aggregate completely covered.
*V. good.*—No oil separation apparent. Mineral aggregate completely covered.

The following examples are cited to illustrate the invention. They are not intended to limit it in any way. The observations were made at the end of a 72 hour interval except as noted. The emulsion consisted of 35% water in asphalt. The stone employed was Rhyolite pebble a surface notable difficult to coat.

| Example | Additive | Conc. | Observation |
| --- | --- | --- | --- |
| I | None | | V. poor. |
| II | 3 ethenoxy tallow amine (distilled)[1] | 0.15 | good.[2] |
| III | ___do[1] | 0.20 | good.[3] |
| IV | ___do[1] | 0.50 | good. |
| V | ___do[1] | 1.0 | v. good. |
| VI | 4 ethenoxy tallow amine (distilled)[1] | 1.0 | good. |
| VII | 5 ethenoxy tallow amine[1] | 1.0 | good. |
| VIII | 3 ethenoxy soyalyl amine (distilled)[1] | 0.15 | good.[2] |
| IX | ___do[1] | 0.20 | good.[3] |
| X | ___do[1] | 0.5 | good. |
| XI | 4 ethenoxy soyalyl amine distilled).[1] | 0.5 | good. |
| XII | 4 ethenoxy soyalyl amine[1] | 1.0 | v. good. |

[1] Indicates av. number of ethenoxy groups per mol of amine.
[2] Indicates observation made after 1 hour submersion.
[3] Indicates observation made after 24 hours' submersion.

By tallow amine and soyalyl amine respectively is meant the amine derivative which results from the replacement of —COOH by —CH$_2$NH$_2$ in the natural mixture of acids as obtained from tallow and soybean oils respectively. By "distilled" is meant that the acids from which the amines were derived were distilled prior to the amine formation. In such case tallow amine is rich in stearylamine, and soyalylamine is rich in olelyamine.

In the compounding of the bitumen in water type emulsions satisfactory results are obtained by inclusion of additives as follows:

| Example | Additive | Conc. |
| --- | --- | --- |
| XIII | 3 ethenoxy stearlyamine[1] | 0.5 |
| XIV | 3 ethenoxy laurylamine[1] | 0.5 |
| XV | 4 ethenoxy stearylamine[1] | 0.5 |

[1] Indicates average number of ethenoxy groups per mol of amine

It is obvious that the mineral aggregate may be coated before or after it is bedded for road construction. It may be applied by spraying, dipping or the like. The emulsion is valuable as a surface for dirt surfaces prior to the placing of concrete or of other hard surfacing to provide a moisture resistant base. It may be applied to normally porous surfaces such as cinder block to accomplish water-proofing. It is also useful as a water-proofing, base cement for the setting of tile. Many other applications and modifications will be apparent to those skilled in the art without departing from the scope of the invention which is defined in the appended claims.

What is claimed is:

1. A composition of matter comprising a water and bitumen emulsion containing the reaction product of a plurality of molecular proportions of ethylene oxide with one molecular proportion of an amine of the formula

wherein $R_1$ is an aliphatic hydrocarbon radical of from 12 to 20 carbon atoms and $R_2$ is a member of the group consisting of $R_1$ and hydrogen.

2. A composition of matter as defined in claim 1 wherein the emulsion is bitumen-in-water.

3. A composition of matter as defined in claim 1 wherein the emulsion is water-in-bitumen.

4. A composition of matter as defined in claim 1 wherein $R_2$ is hydrogen.

5. A composition of matter as defined in claim 1 wherein $R_2$ is an aliphatic hydrocarbon radical of from 12 to 20 carbon atoms.

6. A composition of matter comprising a water and bitumen emulsion containing the reaction product of from 3 to 5 molecular proportions of ethylene oxide with one molecular proportion of an amine of the formula

wherein $R_1$ is an aliphatic hydrocarbon of from 12 to 20 carbon atoms and $R_2$ is a member of the group consisting of $R_1$ and hydrogen.

7. A composition of matter as defined in claim 6 wherein the said amine is a stearyl amine.

8. A composition of matter as defined in claim 6 wherein the said amine contains the mixed aliphatic hydrocarbon radicals of tallow acids.

9. A composition of matter as defined in claim 6 wherein the said amine contains the mixed aliphatic hydrocarbon radicals of soy bean acids.

10. A composition of matter as defined in claim 6 wherein the said amine is a lauryl amine.

11. A composition of matter as defined in claim 6 wherein the said amine is monolauryl amine.

12. A composition of matter as defined in claim 6 wherein the said amine is an oleyl amine.

References Cited in the file of this patent

UNITED STATES PATENTS

| Number | Name | Date |
| --- | --- | --- |
| 1,970,578 | Schoeller et al. | Aug. 21, 1934 |
| 2,375,653 | Holmes | May 8, 1945 |
| 2,436,599 | Read et al. | Feb. 24, 1948 |

FOREIGN PATENTS

| Number | Country | Date |
| --- | --- | --- |
| 229,361 | Great Britain | Feb. 19, 1925 |